US 12,464,469 B2

(12) United States Patent
Kalavakuru et al.

(10) Patent No.: US 12,464,469 B2
(45) Date of Patent: Nov. 4, 2025

(54) TRANSMITTER EFFECTIVE ISOTROPIC RADIATED POWER IMPROVEMENT BY DIRECTIONAL GAIN CALCULATION BASED ON CLIENT POSITION

(71) Applicant: Cisco Technology, Inc., San Jose, CA (US)

(72) Inventors: Sivadeep Reddy Kalavakuru, Akron, OH (US); Fred Jay Anderson, Lakeville, OH (US); Saber Soltani, Copley, OH (US); Xiangxiang Fang, San Diego, CA (US)

(73) Assignee: Cisco Technology, Inc.

( * ) Notice: Subject to any disclaimer, the term of this patent is extended or adjusted under 35 U.S.C. 154(b) by 405 days.

(21) Appl. No.: 18/192,489

(22) Filed: Mar. 29, 2023

(65) Prior Publication Data

US 2024/0334341 A1    Oct. 3, 2024

(51) Int. Cl.
| | | |
|---|---|---|
| *H04W 52/14* | (2009.01) | |
| *H04B 7/0452* | (2017.01) | |
| *H04B 17/309* | (2015.01) | |
| *H04B 17/318* | (2015.01) | |
| *H04W 64/00* | (2009.01) | |

(52) U.S. Cl.
CPC ........ *H04W 52/143* (2013.01); *H04B 17/318* (2015.01); *H04B 17/347* (2023.05); *H04W 64/00* (2013.01); *H04B 7/0452* (2013.01)

(58) Field of Classification Search
CPC . H04W 52/143; H04W 64/00; H04W 52/146; H04W 52/242; H04W 52/245; H04B 17/318; H04B 17/347; H04B 7/0452
See application file for complete search history.

(56) References Cited

U.S. PATENT DOCUMENTS

| | | | | |
|---|---|---|---|---|
| 11,277,850 | B2 * | 3/2022 | Patwardhan | ........ H04W 52/262 |
| 2014/0185481 | A1 | 7/2014 | Seol et al. | |
| 2019/0334605 | A1 | 10/2019 | Strong | |
| 2020/0037183 | A1 * | 1/2020 | Ganu | .................. H04W 52/367 |
| 2020/0112926 | A1 * | 4/2020 | Laghate | ............... H04B 7/0695 |
| 2020/0252887 | A1 | 8/2020 | Andou | |
| 2021/0351815 | A1 | 11/2021 | Zheng et al. | |

FOREIGN PATENT DOCUMENTS

WO    2022001793 A1    1/2022

OTHER PUBLICATIONS

Hemadeh, Ibrahim A., et al. "Layered multi-group steered space-time shift-keying for millimeter-wave communications." IEEE Access 4 (2016): 3708-3718. (Year: 2016).*

\* cited by examiner

*Primary Examiner* — Sharad Rampuria
(74) *Attorney, Agent, or Firm* — Merchant & Gould P.C.

(57) ABSTRACT

Improving transmitter Effective Isotropic Radiated Power (EIRP) may be provided. Improving EIRP may include sending a trigger frame to a client and receiving an uplink transmission from the client in response. A client Transmission (TX) power and a Received Signal Strength Indication (RSSI) associated with the client may be determined using the uplink transmission. Next, a client location may be determined. A pathloss associated with the client may be determined using the client location and the uplink transmission. A directional gain may then be determined using the client TX power, the pathloss, and the RSSI. An array gain is determined based on the directional gain. An Access Point (AP) TX power is adjusted based on the array gain.

19 Claims, 3 Drawing Sheets

TRANSMITTER EFFECTIVE ISOTROPIC RADIATED POWER IMPROVEMENT BY DIRECTIONAL GAIN CALCULATION BASED ON CLIENT POSITION

TECHNICAL FIELD

The present disclosure relates generally to improving transmitter Effective Isotropic Radiated Power (EIRP).

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
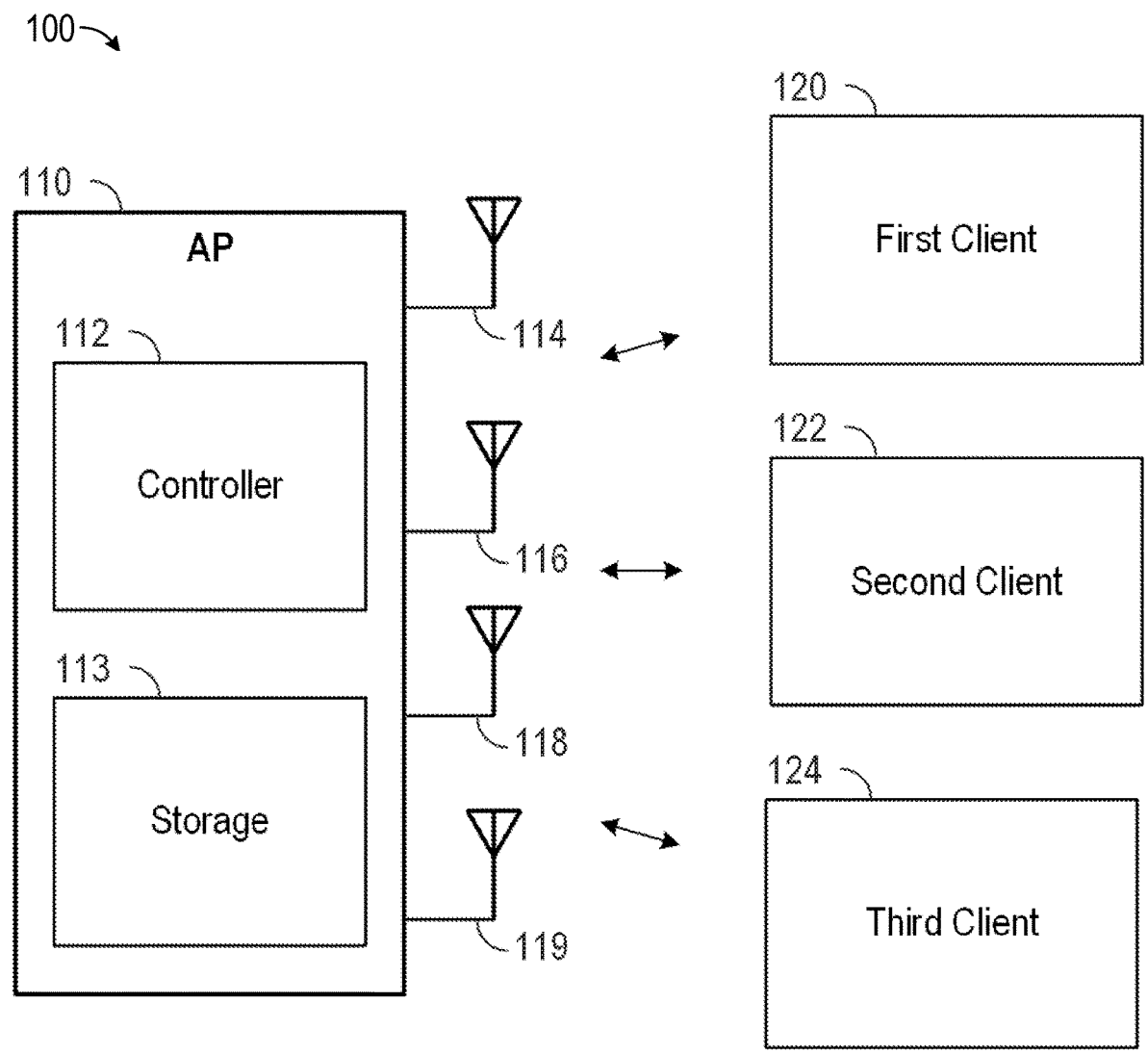
FIG. 1 is a block diagram of an operating environment for improving transmitter Effective Isotropic Radiated Power (EIRP)

Improving transmitter Effective Isotropic Radiated Power (EIRP) may be provided. Improving EIRP may include sending a trigger frame to a client and receiving an uplink transmission from the client in response. A client Transmission (TX) power and a Received Signal Strength Indication (RSSI) associated with the client may be determined using the uplink transmission. Next, a client location may be determined. A pathloss associated with the client may be determined using the client location and the uplink transmission. A directional gain may then be determined using the client TX power, the pathloss, and the RSSI. An array gain is determined based on the directional gain. An Access Point (AP) TX power is adjusted based on the array gain.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Uncorrelated signal combination techniques (e.g., Cyclic Delay Diversity (CDD), Cyclic Shift Diversity (CSD)) may be required to be performed over a narrow Bandwidth (BW) and be subject to the same maximum Transmit (TX) power limitations as unintentional combination methods (e.g., transmit beamforming). For example, the Federal Communications Commission (FCC) may regulate the BW and TX power of radios using uncorrelated signal combination techniques. The regulations may require that data streams transmitted over multiple antennas be correlated, and directional gain caused by the correlation should be calculated using $10*\log(NANT/NSS)$, where NANT is the number of antennas and NSS is the number of spatial streams.

In regulatory frequencies that have strict max TX power guidelines (e.g., the Unlicensed National Information Infrastructure (UNII) range 1 (UNII-1), UNII-2), the requirements for uncorrelated signal combination techniques (i.e., bandwidth and TX power restrictions) may result in a reduction of the total radiated power when transmitting with an uncorrelated signal combination technique such as CDD. The reduction of the total radiated power may be particularly apparent for transmissions using lower numbers of spatial streams (e.g., a single stream per antenna, two spatial streams per antenna).

Signals produced using uncorrelated signal combination techniques in narrow BW due to restrictions may include an unintended array gain that may vary with signal BW, antenna geometry, and cyclic delay values. For example, for a single spatial stream per antenna set up, the array gain using $10*\log(NANT/NSS)$ may be 6 decibels (dB) for a four TX antenna and four Receive (RX) antenna radio (i.e., a 4×4 radio) and may be 9 dB for an 8×8 radio. Consequently, depending on system parameters, it may be appropriate or otherwise necessary to use different values of array gain for compliance with power limits (e.g., the Effective Isotropic Radiated Power (EIRP) of the radio being within the power limits). EIRP is a calculation used to determine the power (i.e., TX power) an isotropic antenna would need to radiate to achieve the measured value of an antenna (e.g., an AP's antenna). Thus, the EIRP of a radio is a representation of the maximum TX power of the radio.

As discussed above, the EIRP of an antenna may be lowered because of array gain. In an example with radios having an EIRP of 24 dB per milliwatt (dBm), a 4×4 radio with a single spatial stream per antenna set up may have TX power limited to 17 dBm (e.g., subtracting the 6 dB array gain from the EIRP of 24 dBm) to meet regulatory limits, and a 8×8 with a single spatial stream per antenna set up may TX power limited to 19 dBm (e.g., subtracting the 9 dB array gain from the EIRP of 24 dBm) to meet regulatory limits. However, not all signals may be correlated in a Multiple-Input Multiple-Output (MIMO) environment. Additionally, array gain may depend on antenna geometry (e.g., peak gain of each element in azimuth (Phi) and elevation (Theta) planes at each angle in space) and relative client position. Thus, a constant TX power back-off due to array gain (e.g., determining array gain using 10*log(NANT/NSS)) may result in a lower maximum TX power limit than the actual possible maximum TX power while staying within regulatory limits.

FIG. 1 is a block diagram of an operating environment 100 for improving transmitter EIRP. The operating environment 100 may include an Access Point (AP) 110. The AP 110 may include a controller 112, a storage 113, a first antenna 114, a second antenna 116, a third antenna 118, and a fourth antenna 119. The first antenna 114, the second antenna 116, the third antenna 118, and the fourth antenna 119 may be TX antennas. The AP 110 may include one or more transmitters that generate TX signals and amplify the signals to one or more of the first antenna 114, the second antenna 116, the third antenna 118, and the fourth antenna 119. The AP 110 may have more or fewer TX antennas in additional examples (e.g., one to eight antennas).

The controller 112 may control the AP 110 to cause the AP 110 to send TX signals via the first antenna 114, the second antenna 116, the third antenna 118, and/or the fourth antenna 119. For example, the controller 112 may control the generation and amplification of TX signals to cause the TX signals to have a desired BW and/or TX power. In some examples, the controller 112 may be external to the AP 110 and/or determine how the AP 110 should operate by communicating with an external device. For example, a Wireless Local Area Network (WLAN) controller may control the operation of the AP 110 and/or the controller 112 may communicate with the WLAN controller to determine how to operate the AP 110.

The storage 113 may store data, and the controller 112 may communicate with the storage 113 to access the data and control the operation of the AP 110 using the data. For example, the storage 113 may store directional gain values of the first antenna 114, the second antenna 116, the third antenna 118, and the fourth antenna 119, maximum directional gain of all antennas, and/or the like. The controller 112 may control the TX power of TX signals generated by the AP 110 using the stored directional gain values. The controller 112 may also determine or otherwise generate and/or receive data (e.g., client position, client TX power, Received Signal Strength Indicator (RSSI), etc.) The storage 113 may store the data the controller 112 determines. In some examples, the data may be stored remotely, and the controller 112 may access the data by communicating with the remote system that stores the data.

The operating environment 100 may also include a first client 120, a second client 122, and a third client 124. The first antenna 114, the second antenna 116, the third antenna 118, and the fourth antenna 119 may send TX signals the AP 110 generates to the first client 120, the second client 122, and/or the third client 124.

During production, the AP 110 may be tested to determine the directional gain of the first antenna 114, the second antenna 116, the third antenna 118, and the fourth antenna 119 for one or more test angles (e.g., different Phi and Theta values) and/or amounts of spatial streams. As discussed above, the storage 113 may stores the directional gain values, and the controller 112 may control the operation of the AP 110 using the directional gain values. However, the actual directional gain associated with a TX signal may change based on the position of the client the TX is sent to.

The testing of the AP 110 may be improved by considering antenna array system peak gain delta between Azimuth (Phi) and Elevation (Theta) cuts at relative angles where one or more clients are located. For large differences between peak gain in Phi (e.g., 5 dB relative to isotropic (dBi)) and Theta (e.g., −20 dBi) for the antenna array (e.g., first antenna 114, the second antenna 116, the third antenna 118, and the fourth antenna 119) of the AP 110 at a certain angle in space, the directional gain may be based on peak gain in Phi or Theta alone. Determining the directional gain based on peak gain in Phi or Theta may result in a lower directional gain and an increase in EIRP.

The controller 112 may adjust the TX power of the AP 110 based on client position and/or the attributes of the communication link with the client (e.g., number of antennas used for the communication, number of spatial streams used for the communication, client link budget) to improve the EIRP of the AP 110 (e.g., improve the EIRP of the AP's 110 transmitter(s)). Thus, the controller 112 may first determine and/or the AP 110 may receive the position of clients the AP 110 is communicating with, such as the first client 120, the second client 122, and the third client 124.

The controller 112 may determine the position of clients using client TX power, pathloss, and/or a RSSI of the client, a measurement of the power of a received signal. The controller 112 may cause the AP 110 to send a TX signal to one or more clients (e.g., the first client 120, the second client 122, the third client 124) to trigger the one or more clients to send uplink transmissions back to the AP 110. The TX signal may be a trigger frame, and the AP 110 may send the trigger frame using High Efficiency (HE) trigger based uplink Orthogonal Frequency-Division Multiple Access (OFDMA) or MIMO capabilities. The AP 110 may send trigger frames to multiple clients simultaneously to determine the position of each client.

The trigger frame may include a target RSSI and/or the AP 110 TX power. In an example, the AP 110 is determining the position of the first client 120, but the AP 110 may determine the position of multiple clients (e.g., additionally determining the position of the second client 122 and/or the third client 124) simultaneously as well. The first client 120 may receive the trigger frame and determine a TX power for sending signals back to the AP 110 using the target RSSI and/or the AP 110 TX power. The first client 120 may also determine an estimated pathloss using the trigger frame, and the first client 120 may also use the estimated pathloss to determine the TX power for sending signals back to the AP 110. The first client 120 may then send an uplink transmission having the determined TX power back to the AP 110 in response to the trigger frame.

The controller 112 may determine the TX power of the first client 120, the pathloss (e.g., Over the Air (OTA) pathloss), the link budget, and/or RSSI of the first client 120 using the received uplink transmissions and/or target RSSI sent to the respective client. The controller 112 may then estimate the position of the first client 120 using the TX power of the first client 120, the pathloss, the link budget, and/or the RSSI. The controller 112 may determine the pathloss using equation 1, shown below:

$$\text{Pathloss} = 20 * \log_{10}(d) + 20 * \log_{10}(f) + 20 * \log_{10}(4 * \pi / c) \quad (1)$$

Pathloss may vary for communications, and the controller 112 may average the pathloss over multiple received transmissions from one client or from multiple clients in a single angle and direction to address the variation. For example, the controller 112 may use ten RSSI samples from a single client at different client TX power levels using trigger frame with various target RSSIs.

In equation 2, d is the distance between the AP 110 and the client, f is the frequency of the transmission (e.g., the uplink transmission sent by the client), and c is the speed of light. The controller 112 may determine the distance d using the determined position of the client. The controller 112 may determine the frequency f based on the band the AP 110 and client are using to communicate.

Once the client positions are estimated, the controller 112 may determine the directional gain associated with the first client 120 using the position of the first client 120, the pathloss, and/or the RSSI of the first client 120. In an example, the controller 112 determines the directional gain associated with a client using equation 2, shown below:

$$\text{Directional Gain} = \text{Client } TX \text{ Power} + \text{Pathloss} - RSSI \quad (2)$$

The AP 110 may also adjust or otherwise control the target RSSI to increase or decrease the transmit power of a client (e.g., a Station (STA)) to determine a better estimation or refine the estimation of RSSI and antenna gain. In some examples, the AP 110 may cause clients to send uplink transmissions at various TX powers. The AP 110 may use the multiple uplink transmissions having various TX powers to determine or refine the estimation of RSSI and/or antenna gain.

The controller 112 may use multiple determined directional gains associated with a client to determine a total directional gain. For example, the controller 112 may use the directional gain associated with the first client 120, the directional gain associated with the second client 122, and the directional gain associated with the third client 124 to determine a total directional gain or array gain. The controller 112 may require a minimum amount of directional gains associated with a client to accurately determine the array gain. For example, the controller 112 may use a minimum data set (e.g., the client position, the pathloss, the RSSI, the directional gain associated with the client) of ten clients or ten TX configurations (e.g., two data sets for a single client from two target RSSIs, different spatial stream packets, different antenna combinations, etc.) to determine the array gain.

To determine array gain, the controller 112 may determine the spherical Three Dimensional (3D) Multi-User MIMO Composite Directional Gain (3D-MU-MIMO-CDG) for all antennas (e.g., the first antenna 114, the second antenna 116, the third antenna 118, and the fourth antenna 119). The controller 112 may determine local extrema (i.e., a maximum and a minimum) for each 2D cut and a global extrema. Using the array gain the controller 112 determines to determine TX power instead of the static array gain (i.e., determining array gain using 10*log(NANT/NSS), may result in a higher TX power for the AP 110 while the AP 110 still operates within regulatory limits (e.g., EIRP and Power Spectral Density (PSD) limits for sub-bands).

Once the controller 112 determines the array gain of the AP 110, the controller 112 may adjust the TX power of the AP 110 based on the array gain. The controller 112 may improve the EIRP of the AP 110, by 3 to 4 dB for example, compared to using the static array gain because the determined array gain is a more accurate representation of the operation of the AP 110. The improved EIRP of the AP 110 may allow the AP 110 to have a higher range and/or improved throughput (e.g., moving to a higher Modulation and Coding Scheme (MCS) with additional margin available on linearity for more antennas (e.g., 4×4, 8×8).

Figure 2:
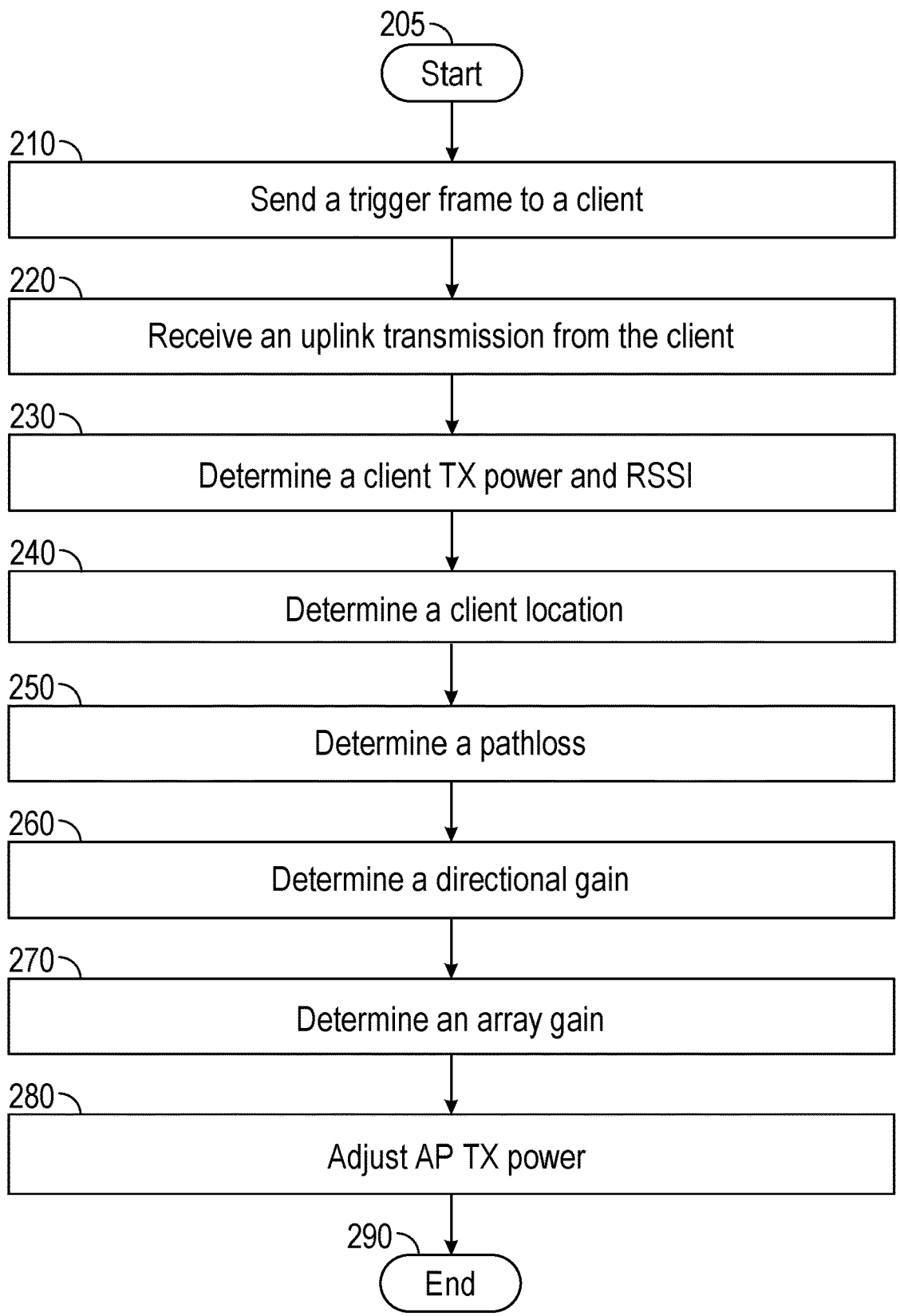
FIG. 2 is a flowchart of a method for improving transmitter EIRP.

FIG. 2 is a flowchart of a method 200 for improving transmitter EIRP. The method 200 may begin at starting block 205 and proceed to operation 210. In operation 210, a trigger frame is sent to a client. For example, the AP 110 sends a trigger frame to the first client 120. The trigger frame may include a target RSSI and be sent at a TX power.

In operation 220, an uplink transmission is received from the client. For example, the AP 110 receives the uplink transmission from the first client 120 in response to sending the AP 110 sending the trigger frame to the first client 120 in operation 210. The first client 120 may use the target RSSI and TX power of the trigger frame to determine the client TX power with which to send the uplink transmission.

In operation 230, a client TX power and a RSSI associated with the client is determined using the uplink transmission. For example, the controller 112 determines the client TX power and the RSSI associated with the first client 120 using the uplink transmission received in operation 220.

In operation 240, a client location is determined. For example, the controller 112 may determine the location of the first client 120 using the RSSI, the client TX power, and/or the like.

In operation 250, a pathloss associated with the client is determined. For example, the controller 112 may determine the pathloss associated with the first client 120 using the client location and the uplink transmission.

In operation 260, a directional gain is determined. For example, the controller 112 determines the directional gain associated with TXs to the first client 120 using the client TX power, the pathloss, and the RSSI.

In operation 270, an array gain is determined. For example, the controller 112 may determine the array gain based on the directional gain determined in operation 260. The controller 112 may use multiple directional gains associated with one or more clients to determine the array gain.

In operation 280, an AP TX power is adjusted. For example, the controller 112 causes the TX power of the AP 110 to be adjusted based on the array gain determined in operation 270. The TX power may be adjusted to allow the AP 110 to send TX signals with a maximum power while operating within regulatory limits. The method 200 may conclude at ending block 290.

Figure 3:
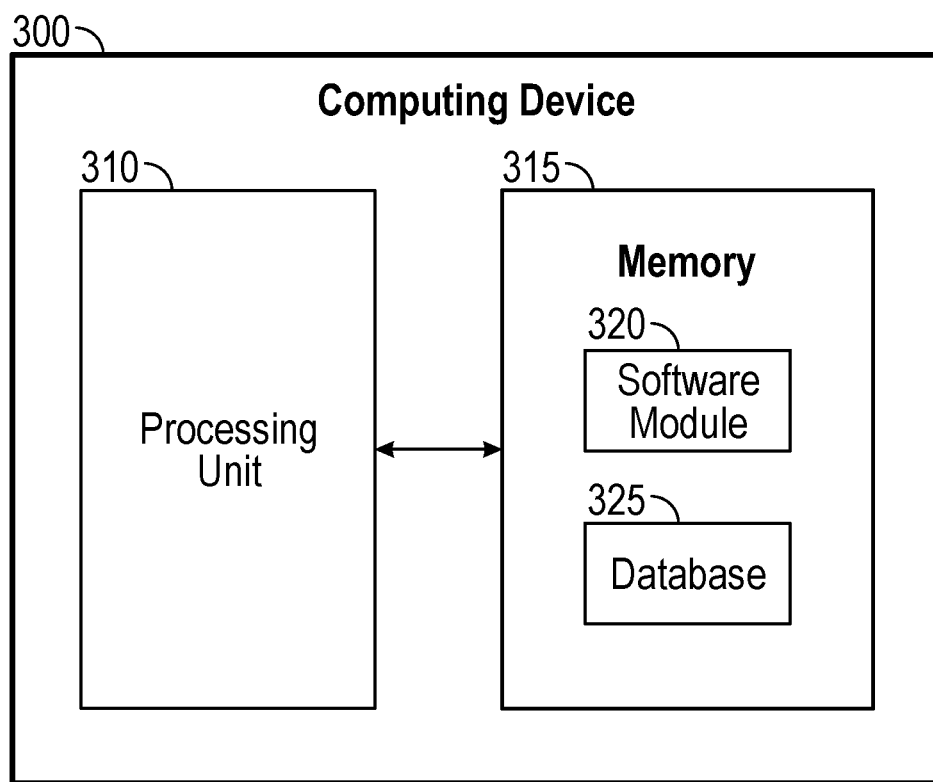
FIG. 3 is a block diagram of a computing device.

FIG. 3 is a block diagram of a computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for improving transmitter EIRP with respect to FIG. 1 and FIG. 2. Computing device 300, for example, may provide an operating environment for the AP 110, the controller 112, the storage 113, the first client 120, the second client 122, the third client 124, and the like. The AP 110, the controller 112, the storage 113, the first client 120, the second client 122, the third client 124, and the like may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
sending a trigger frame to a client;
receiving an uplink transmission from the client;
determining a client Transmission (TX) power and a Received Signal Strength Indication (RSSI) associated with the client using the uplink transmission;
determining a client location;
determining a pathloss associated with the client using the client location and the uplink transmission;
determining a directional gain using the client TX power, the pathloss, and the RSSI;
determining an array gain based on the directional gain, wherein determining the array gain comprises determining a spherical Three Dimensional Multi-User Multiple-Input Multiple-Output Composite Directional Gain (3D-MU-MIMO-CDG); and
adjusting an Access Point (AP) TX power based on the array gain.

2. The method of claim 1, wherein the trigger frame comprises a target RSSI.

3. The method of claim 2, wherein the client determines the client TX power using the target RSSI.

4. The method of claim 2, further comprising:
sending one or more additional trigger frames, wherein each additional trigger frame comprises a new target RSSI;
receiving one or more additional uplink transmissions in response to the one or more additional trigger frames; and
determining one or more additional directional gains using the one or more additional uplink transmissions, wherein determining the array gain is further based on the one or more additional directional gains.

5. The method of claim 4, wherein determining the one or more additional directional gains comprises:
for each additional uplink transmission:
determining a new client TX power associated with the additional uplink transmission and a new RSSI associated with the additional uplink transmission;
determining a new client location;
determining a new pathloss associated with the client using the new client location and the additional uplink transmission; and
determining the additional directional gain using the new client TX power, the new pathloss, and the new RSSI.

6. The method of claim 1, further comprising determining attributes of a communication link with the client, wherein adjusting the AP TX power is based on the attributes.

7. A system comprising:
a memory storage; and
a processing unit coupled to the memory storage, wherein the processing unit is operative to:
send a trigger frame to a client;
receive an uplink transmission from the client;
determine a client Transmission (TX) power and a Received Signal Strength Indication (RSSI) associated with the client using the uplink transmission;
determine a client location;
determine a pathloss associated with the client using the client location and the uplink transmission;
determine a directional gain using the client TX power, the pathloss, and the RSSI;
determine an array gain based on the directional gain, wherein determining the array gain comprises determining a spherical Three Dimensional Multi-User Multiple-Input Multiple-Output Composite Directional Gain (3D-MU-MIMO-CDG); and
adjust an Access Point (AP) TX power based on the array gain.

8. The system of claim 7, wherein the trigger frame comprises a target RSSI.

9. The system of claim 8, wherein the client determines the client TX power using the target RSSI.

10. The system of claim 8, the processing unit being further operative to:
send one or more additional trigger frames, wherein each additional trigger frame comprises a new target RSSI;
receive one or more additional uplink transmissions in response to the one or more additional trigger frames; and
determine one or more additional directional gains using the one or more additional uplink transmissions, wherein to determine the array gain is further based on the one or more additional directional gains.

11. The system of claim 10, wherein to determine the one or more additional directional gains comprises:
for each additional uplink transmission, to:
determine a new client TX power associated with the additional uplink transmission and a new RSSI associated with the additional uplink transmission;
determine a new client location;
determine a new pathloss associated with the client using the new client location and the additional uplink transmission; and
determine the additional directional gain using the new client TX power, the new pathloss, and the new RSSI.

12. The system of claim 7, the processing unit being further operative to determine attributes of a communication link with the client, wherein to adjust the AP TX power is based on the attributes.

13. A non-transitory computer-readable medium that stores a set of instructions which when executed perform a method executed by the set of instructions comprising:
sending a trigger frame to a client;
receiving an uplink transmission from the client;
determining a client Transmission (TX) power and a Received Signal Strength Indication (RSSI) associated with the client using the uplink transmission;
determining a client location;
determining a pathloss associated with the client using the client location and the uplink transmission;
determining a directional gain using the client TX power, the pathloss, and the RSSI;
determining an array gain based on the directional gain, wherein determining the array gain comprises determining a spherical Three Dimensional Multi-User Multiple-Input Multiple-Output Composite Directional Gain (3D-MU-MIMO-CDG); and
adjusting an Access Point (AP) TX power based on the array gain.

14. The non-transitory computer-readable medium of claim 13, wherein the trigger frame comprises a target RSSI.

15. The non-transitory computer-readable medium of claim 14, wherein the client determines the client TX power using the target RSSI.

16. The non-transitory computer-readable medium of claim 14, wherein the method executed by the set of instructions further comprises:
sending one or more additional trigger frames, wherein each additional trigger frame comprises a new target RSSI;
receiving one or more additional uplink transmissions in response to the one or more additional trigger frames; and
determining one or more additional directional gains using the one or more additional uplink transmissions, wherein determining the array gain is further based on the one or more additional directional gains.

17. The non-transitory computer-readable medium of claim 16, wherein determining the one or more additional directional gains comprises:
for each additional uplink transmission:
determining a new client TX power associated with the additional uplink transmission and a new RSSI associated with the additional uplink transmission;
determining a new client location;
determining a new pathloss associated with the client using the new client location and the additional uplink transmission; and
determining the additional directional gain using the new client TX power, the new pathloss, and the new RSSI.

18. The non-transitory computer-readable medium of claim 13, further comprising determining attributes of a communication link with the client, wherein adjusting the AP TX power is based on the attributes.

19. The non-transitory computer-readable medium of claim 13,
- wherein determining the array gain comprises determining the array gain using multiple directional gains associated with one or more clients to determine the array gain.

\* \* \* \* \*